United States Patent

[11] 3,597,855

[72] Inventors Bretislav Stejskal;
Vladimir Stepan; Petr Vlach, all of Praha, Czechoslovakia
[21] Appl. No. 757,999
[22] Filed Sept. 6, 1968
[45] Patented Aug. 10, 1971
[73] Assignee Tesla, Narodni Podnik
Prague, Czechoslovakia
[32] Priority Sept. 9, 1967
[33] Czechoslovakia
[31] 6457-67

[54] UNIVERSAL ADAPTIVE AUDIOVISUAL TEACHING MACHINE
9 Claims, 8 Drawing Figs.

[52] U.S. Cl. ................................................ 35/9 R
[51] Int. Cl. ................................................ G09b 7/04
[50] Field of Search .................................... 35/9

[56] References Cited
UNITED STATES PATENTS

| | | | |
|---|---|---|---|
| 3,355,818 | 12/1967 | Whitehorn .................... | 35/9 |
| 3,355,819 | 12/1967 | Hannah et al. ................ | 35/9 |
| 3,383,781 | 5/1968 | Diuzet .......................... | 35/9 |

*Primary Examiner*—William M. Grieb
*Attorney*—Richard Low

ABSTRACT: A universal adaptive audiovisual teaching device having visual display means, sound reproducing means and input means for a response by the user. A decision system is provided having a basic decision unit, a stepping unit and timing unit. The decision unit includes a control memory, a peripheral memory and a selector. The decision unit receives information from the visual, sound and response input units, evaluates and compares the response to the audio-visual units and directs movement of the audio-visual units to appropriate activating positions.

Patented Aug. 10, 1971

INVENTORS
Břetislav Stejskal, Vladimír Štěpán, Petr Vlach

By Richard [...]
ag't

INVENTORS
Břetislav Stejskal, Vladimír
Štěpán, Petr Vlach

UNIVERSAL ADAPTIVE AUDIOVISUAL TEACHING MACHINE

The invention relates to an universal adaptive audiovisual teaching machine representing a synthesis of all possibilities and requirements of program teaching and learning in one device.

There have been known many different types of teaching devices which may be divided in following groups:

a. Universal computers used in the function of teaching devices.

b. special automatic teaching computers having either a keyboard input or another input. These machines are likewise provided with a printing output, and besides with a projection apparatus, either for static, or for cinematic visual information which is usually accompanied by a sonic information.

c. teaching machines of a special design for a certain purpose which are provided with a greater number of pushbuttons to control the student's responses.

Teaching machines mentioned under a. and b. offer a broad choice of student's responses control, moreover they offer the possibility of presenting different types of program, and they are able to operate even adaptive programs. The actual cost, as well as the operation cost of these types of machines is comparatively very high.

Most teaching machines mentioned under c. only decide, if the response chosen from a certain number of responses is correct or incorrect. Teaching machines of this type operate either on the base of linear program of Pressey-type in which a proceeding to the next part of the given task is possible after the previous part of the task was solved. Another processing of the given program is possible with respect to the quality of student's responses. The purpose of most of these teaching machines resides in the difference of the correct response from the incorrect one. Teaching machines which are able to distinguish the extent and the character of correct, or of incorrect response are designed on the base of Crowders branching type. They usually operate by a firm algorith which depends on the design of the teaching machine, not depending on the type of program to be used. For this reason the author of the program has to take into his consideration the above-mentioned circumstances which is often not without detriment of his pedagogical aims. In most cases the teaching machines of this type work with selected responses produced by one element only, there are only a few of them which work with selected responses produced by more elements. For all teaching machines of this kind it is typical and common, that their responses must be considered as a whole, which results in functional and pedagogical disadvantages. The selected responses presented by these machines do not give the possibility to express the nuance required, as for instance in the higher class of teaching machines. Some of the known teaching machines of this class which are designed with regard to some special requirements, and which allow a reasonable control of the presented responses are difficult to be controlled, the consequence of which is that the student is not able to concentrate well to his task. The algorithm of these other types of teaching machines controlling the created responses is very simple. Some of them are able to evaluate individually the whole response, as for instance a mathematical formula, or a mathematical expression. Besides, it is not possible to trace further course of the program with respect to the quality of foregoing responses. Among the known teaching machines there are not many which present simultaneously the visual and the sonic information. The visual demonstration is usually of static kind. The number of pushbuttons or similar elements permitting the choice of responses is comparatively small. In the case of above-mentioned teaching machines there is an increased possibility of a correct answer achieved by an accident.

All the above-mentioned disadvantages of known teaching machines are overcome by an universal adaptive audiovisual teaching device consisting of a device for picture projection and for aural reproduction, and provided with an input unit consisting of a pushbutton system which is connected to a system of logical circuits, and furtheron provided with at least one periphery memory. The input unit being formed by a pushbutton system, is connected either to the input of a selector, or to the input of an basic decision unit of a decision system. The output of the basic decision unit being connected to the input of a stepping unit, the output of which controls the input of a tacting unit controlling the control memory unit. The output of control memory unit which being connected, on the one hand, to a communication system for the student-display, and, on the other hand, forming a feedback to the basic decision units, to the stepping unit, and to the tacting unit, the output of the tacting unit being connected across the first, second and third stepping gate to the input of a tacting unit and across a system of setoff input gates to the input of the basic decision unit. The output of the selector is connected to all units of the decision system and to the unit of peripheral memories which is likewise controlled by the output of the control memory unit. The outputs of the input unit's pushbutton system are connected across the system of setoff input gates to a student's choice register system, the individual outputs of which being connected to the input of a basic decision decoder, to the same input being applied the signal outputs from the outputs of the control memory unit. The output of said basic decision decoder is applied across the first and second operational-state gate, actuated by the selector, to the input of the stepping unit. Two more outputs of the pushbutton system are connected across the system of the setoff input gates to the student's choice registers, their output being connected to the input of a free shifting decoder, to the same input being connected the outputs of the control memory unit, and the operating state signal from the output of the selector. The free shifting forward signals, and the free shifting backward signals from the free shifting decoder are connected to the input of the stepping unit. All setoff gates and unit inputs of the student's choice register are connected to the output of an operating time control unit of the tacting unit. The stepping consists of two parts namely of the initiating part and of the actuating part. To the initiating part there is connected the coincidency signal, and the incoincidency signal from the basic decision decoder, the free shifting forward signal, and the free shifting backward signal from the free shifting decoder, the "? pushbutton output, and the signal outputs from the control memory unit as well the operating-state signal from the output of the selector. The initiating part of the stepping unit being connected, on the one hand, to the output channel of the evaluating signal of correct responses, and to the output of the evaluating signal of wrong responses, and, on the other hand, by three outputs to the input of the actuating part of the stepping unit, to the same input being connected the output of the tacting unit and two outputs from the control memory unit. The forward actuating signal and the backward actuating signal are applied to the input of the tacting unit. The initiating part of the stepping unit consists of four circuits for permission of a new step, namely of the incoincidency step permitting circuit, of the coincidency step permitting circuit, of the forward step permitting circuit and of the backward step permitting circuit, the first two of which being connected by the coincidency signal and by the incoincidency signal to the input of the basic decision decoder, and by the signal channel leading to the input of the control memory unit. To the circuits for permitting the forward and the backward step there are applied the free shifting forward signal and the free shifting backward signal from the free shifting decoder and from the free shifting permission signal from the second OR-gate, to the input of which there is applied, on the one hand, the fast shifting signal from the selector, and, on the other hand a signal from the control memory unit which is applied across the third operational-state gate connected to the operating-state signal from the selector. The outputs of the conditional signals of incoincidency, or the conditional signal of coincidency from the incoincidency step permitting circuit or from the coincidency step permitting circuit are connected to the input of a initiating decoder, and the outputs either from the forward step permitting circuit or from the backward step permitting circuit are applied to the input of the initiating part of the stepping unit. The signal of the "?" pushbutton is applied across the fourth gate of the operational-state connected to the operating-state signal from the selector, on the one hand, to the initiating decoder, and, on the other hand, to the first OR-gate, to which there is also applied the gated incoincidency signal. The evaluating signals are controlled either by the output of the first OR-gate across the evaluating gate of wrong responses and by the output of the evaluating gate of correct responses. The evaluating gate of wrong responses and the evaluating gate of correct responses are controlled by one output from the control memory unit, the signal of which passes through the main evaluating gate, the second input of which being connected with the actuating part of the stepping unit by means of a stepping signal. Three outputs of the initiating decoder are connected to the actuating part of the stepping unit, namely the first initiating signal across the first stepping gate, the second initiating signal across the second stepping gate, and the third initiating signal across the third stepping gate, said stepping gates being controlled by the step blocking circuit, and the first two channels being applied to the unit inputs, either of the backward step or forward step memories, and the output of the third stepping gate being directly connected to the forward motion permitting circuit, and the reset input of the backward step memory and of the forward step memory being connected either across the backward stepping gate, or forward stepping gate to the outputs of the control memory unit, said stepping gates being controlled by the signal of the tacting unit. The backward actuating signal from the backward step memory is applied to the backward motion permitting circuit and the actuating signal from the forward motion permitting circuit is applied to the forward motion permitting circuit. To the input of the forward motion permitting circuit there is moreover applied the output from the periphery memory unit, as well as the output from the forward step permitting circuit. To the backward motion permitting circuit there is applied the output of the backward step permitting circuit. The tacting unit is composed of the backward tact memory and of the forward tact memory, to their unit inputs being connected across the backward tacting gate, or forward tacting gate the outputs from the actuating part of the stepping unit, while on their reset inputs there is directly connected the output from the control memory unit. The backward operation signal from the backward tact memory, as well as the forward operational signal from the forward tact memory are applied to the control circuit for the direction of the driving motors of the control memory unit and besides to the tact signalizing circuit the output of which controls the forward step gate and the backward step gate of the stepping unit, moreover being applied to the input of the operating time control unit, the output of which is connected to the input of the basic decision unit. The output of the tact signalizing circuit is moreover connected to the input of the tact blocking unit, to the same input being connected the start signal from the peripheral memories of the periphery memory unit. The output from the tact blocking circuit there is connected, on the one hand, to the input of the backward tacting gate, and to the input of the forward tacting gate, and on the other hand, to the input of the step blocking circuit of the stepping unit. The selector of the logical circuits is produced by a set of three bistable register elements which are directly controlled by the choice of student, the output of the first register of selector's operating state being connected to the operating state gate, to which there is also connected the output of the second register of selector's operational-state. The output of the operating-state gate being applied on the one hand together with output of the free shifting register to the input of the fast shifting gate, and, on the other hand, it is connected to the first, second, third and fourth operating-state gate, as well as to the input of a coupled gate of peripheral devices control. The fast shifting signal is applied to the second OR-gate of the stepping unit. The peripheral memory unit is composed of the peripheral control memory unit comprising peripheral memory control register, and at least of one more additive peripheral control unit. To the unit input of the peripheral memory control register there is connected the output from the coupled gate of peripheral devices control, to the input of which there is connected the output from the control memory unit and besides the operating-state signal from the selector and the stepping signal from the step blocking circuit. The start signal of the peripheral memories on the logical one-output of the peripheral memory control register being applied, on the one hand, to the input of the tact blocking circuit, and, on the other hand, to the peripheral control unit. To the reset input of the peripheral memory control register there is applied the stop signal of periphery memories from the peripheral control unit, the output of the logical zero of the peripheral memory control register being applied across the second shaping member to the peripheral memory reaction gate together with the output of the control memory unit, the output of the peripheral memory reaction gate being applied to the input of the forward motion permitting circuit.

The responses, inclusive the created responses, storaged in the memory, and consequently in the program are composed of more elements which may be distributed to individual elements, representing the student's reactions. Said reaction may be evaluated individually, or they can be corrected with respect to the running program. Moreover, it is possible to explain their correctness or incorrectness, and, besides, to change the genuine task, if necessary.

The universal adaptive audiovisual teaching device according to the description will now be described in more detail by means of following drawings, in which FIG. 1 represents the total diagram of the device showing the main parts of it;

Figure 1:
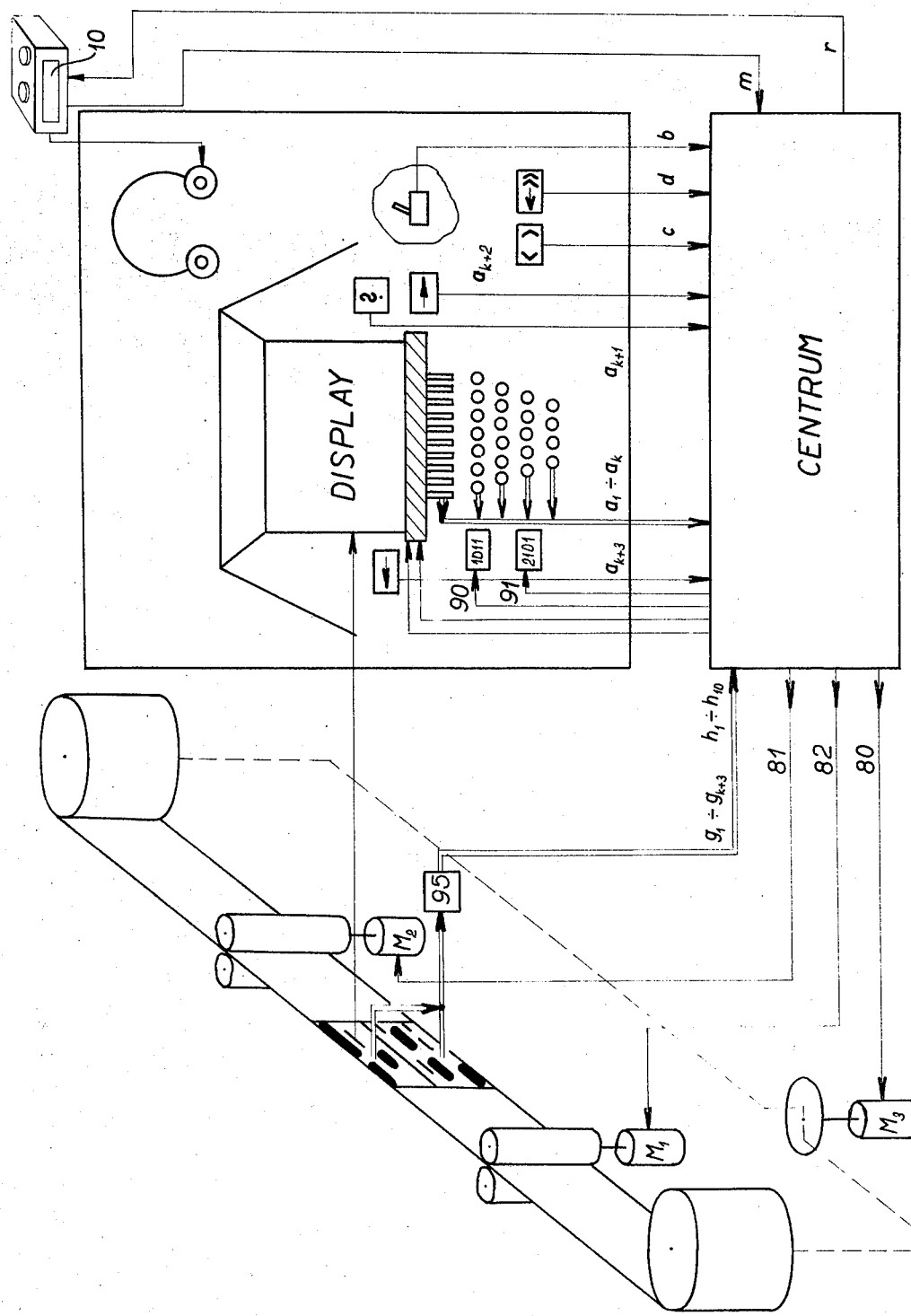
Figure 2:
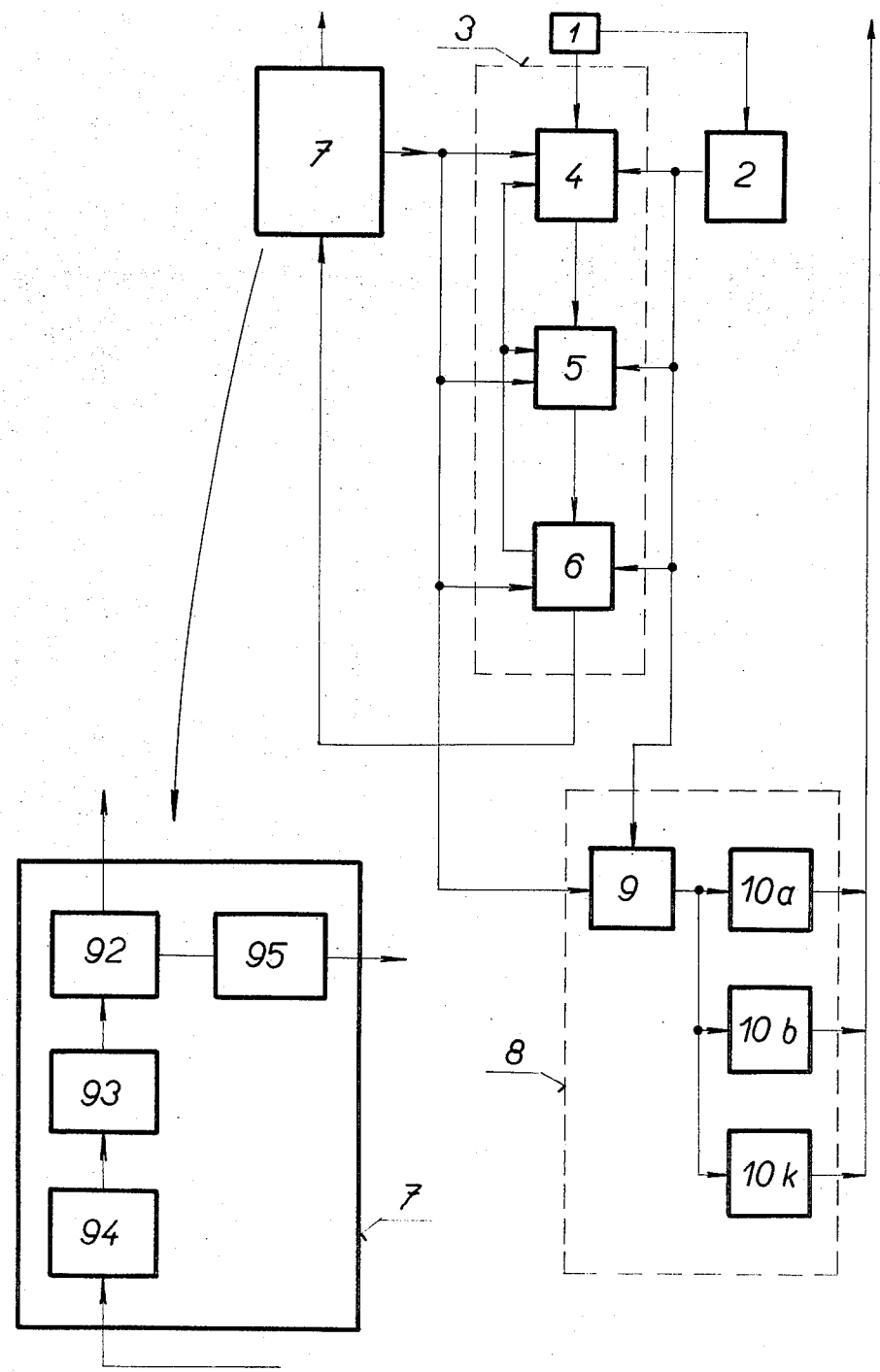
FIG. 2 represents the total logic block diagram of the control and decision parts.

The complete logical arrangement of the control and decision part of the teaching device is illustrated in FIG. 2. The switched-on teaching device is put into operation in that the student pushes down some of the keyboard pushbutton of the input unit, by which a signal is transmitted, on the one hand, to the selector 2, and, on the other hand, to the decision system 3. In this way a certain mode is set on, and one operating cycle of the machine is carried out. During this cycle the device is not sensitive to any other reaction of the student and the teaching process cannot be disturbed by some accidental actuating of pushbuttons. The decision system is composed of three parts, namely of the basic decision unit 4, of the stepping unit 5, and of the tacting unit 6. The basic decision unit 4 evaluates the correct response of the student with respect to the reference signals $g_1$ to $g_k$ coded on appropriate place of the memory medium by means of reference signals from the control memory unit 7. Said carrying medium is mostly represented by a film. After processing in the basic decision unit 4 there is evaluated the step-condition in the stepping unit 5, after which one or more steps are effected according to the information coming from the control memory unit 7 into the stepping unit 5 with respect to the state of the basic decision unit 4. During the operating cycle one or more steps can be effected in the forward, as well as in the backward direction. This allows a fast programming on creating loops in the operation sequence.

The stepping unit 5 actuates the tacting unit 6 which provides the shifting of medium in the control memory unit 7 by one cell, either forward or backward. In order to realize this tact a command is necessary from the stepping unit 5.

The basic statements needed for evaluation of the quality of student's response and proper instructions for cooperation with decision system 3 are recorded on the medium in the control memory unit 7. At the same time an information record on a corresponding place of the medium takes place which is evaluated by means of an indicating system which may be represented, for instance, by a display screen or by some other convenient means to be presented to the student.

Figure 4:
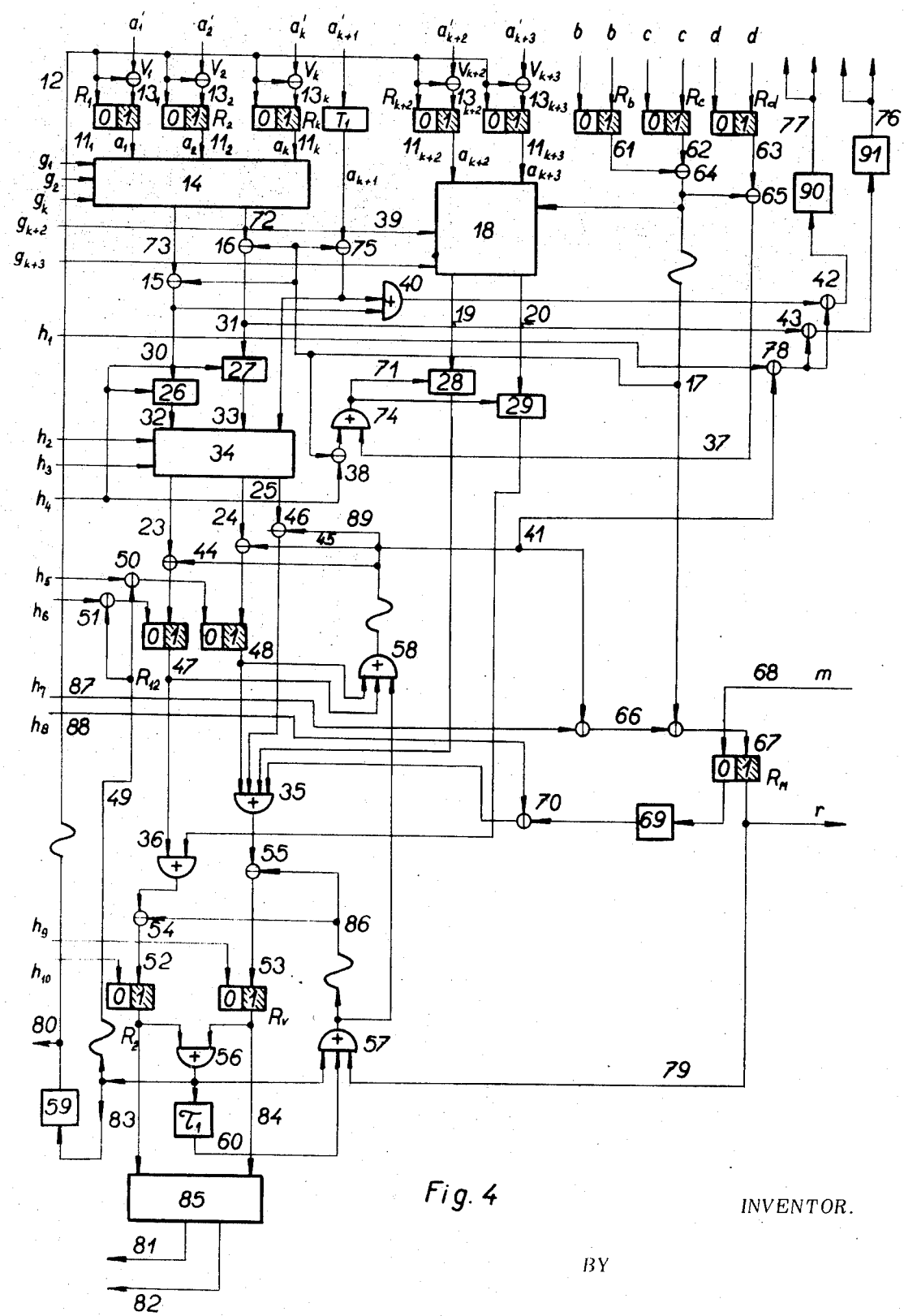
FIG. 4 represents in more details the logical diagram of circuits providing the logical decision and control of the operation of the device, and illustrating the arrangement of the stepping unit, selector and peripheral memory unit.

The universal adaptive audiovisual teaching device is furtheron provided with a peripheral memory unit 8 which contains, on the one hand, the unit controlling the peripheral memories 9, and on the other hand, at least one additive memory device, as for instance a tape recorder a film projector etc. As shown in FIG. 4 the input signals $a_1, a_2.....a'_{k+2}, a'_{k+3}$ of the student's responses are applied to a set of student's choice register $11_1, 11_2...11_{k+2}, 11_{k+3}$, the operation mode of which is derived from the operation-time control unit 59 which is located in the tacting unit 6. By the signal 12 of the operating cycle's end from the output of the operation-time control unit 59 all memory elements 11 are setoff to zero, and simultaneously open the setoff input gates 13 in order to enable next choice to the student. The output signals of the memory elements $11_1, 11_2...11_k$ are compared by means of basic decision decoder 14 with output signals "$g_t$" from the control memory unit 7. The opening of the first and second operational state gates 15,16 on the output from the basic decision decoder 14 is provided by means of the operating-state signal 17 from selector 2.

By stimulating the signal $a_{k+2}$ or $a_{k+3}$ the student is given opportunity of fast shifting the film in both directions. By one of the two mentioned signals either the memory element $11_{k+2}$ or $11_{k+3}$ changes its state, transmitting a signal to the free shifting decoder 18. The output of this decoder 18 is connected to the stepping unit 5. The decoder 14 is designed so that its outputs realize the logical function described by the Boolean relations $$Y_{72} = \sum_{t=1}^{k} a_t \cdot g_t$$

$$Y_{73} = \sum_{t=1}^{k} a_t \cdot \overline{g_t} \quad (1)$$

This function evaluates the quality of student's response. The free shifting decoder 18 brings about the evaluation of the free shifting possibility, said function being described by the Boolean equation:

$Y_{19} = a_{k+2}(g_{k+2} + \overline{X}_{17})$ (2)
$Y_{20} = a_{k+3}(g_{k+3} + \overline{X}_{17})$ where $Y_{19}, Y_{20}$ are Boolean variables either on the free shifting forward signal 18 or on the backward free shifting signal 19 and $X_{17}$ is the Boolean value of the operating-state signal 17.

Figure 3:
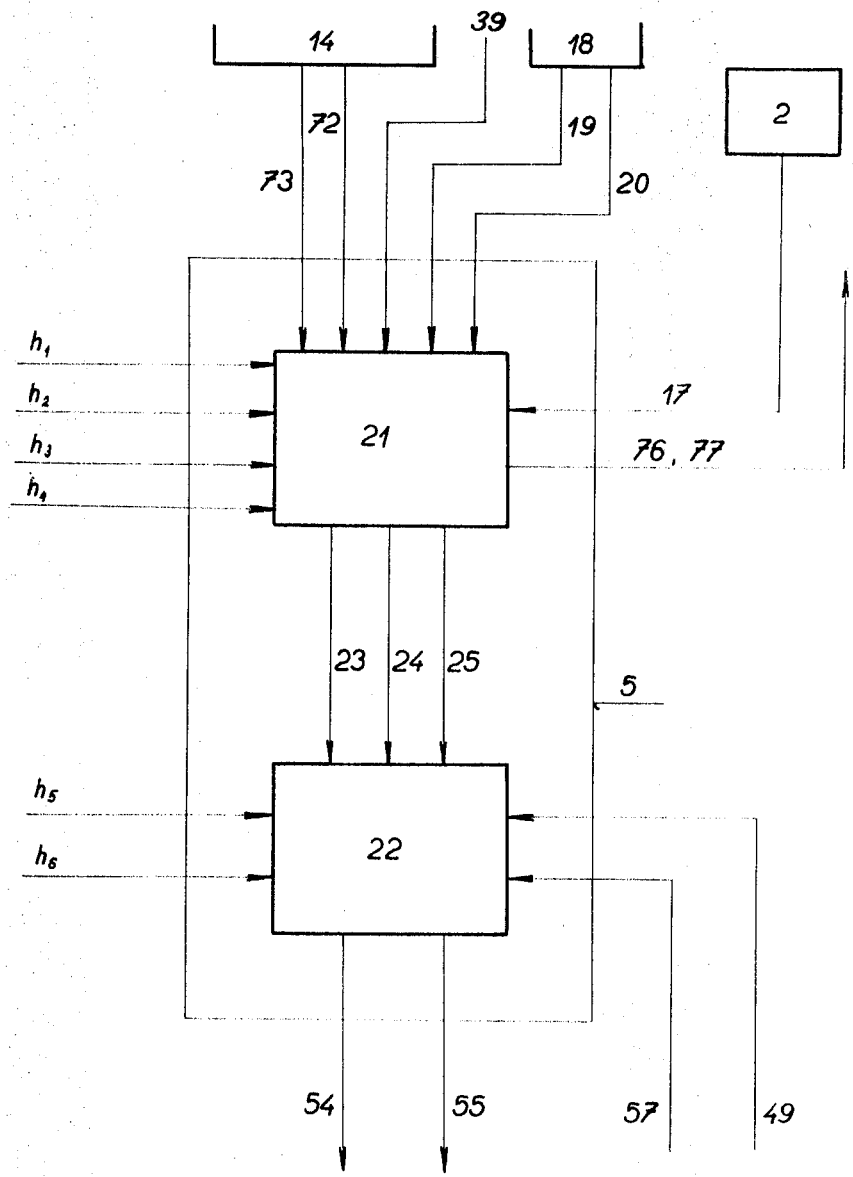
FIG. 3 represents the block diagram of the stepping unit shown in FIG. 2.

The stepping unit is composed of two main parts illustrated in FIG. 3, namely of the initiating part 21 of the stepping unit 5, and of the actuating part 22 of the stepping unit 5. The initiating part 21 of the stepping unit is excited by means of signals $h_2, h_3, h_4$ in order to develop a new-step condition, which is signalized by the channels 23, 24, 25 into the decision part 22 of the stepping unit 5. The decision part 22 keeps the tacting unit 6 in operation, and after the end of the operation it operates according to the state of initiating part 21 which is moreover controlled by the operating-state signal 17 from the output of selector 2.

The logical arrangement of the initiating part 21 of the stepping unit 5 is illustrated in FIG. 4. The free shifting forward signal 19, the free shifting backward signal 20, the incoincidency gating signal 30, and the coincidency gating signal 31 of the basic decision unit are connected in the same order to the inputs of the incoincidency step permitting circuit 26 to the coincidency step permitting circuit 27, to the forward step permitting circuit 28 and backward step permitting circuit 29. The incoincidency step permitting circuit 26, and the coincidency step permitting circuit 27 are directly controlled by the signal $h_4$. By the output of the decoder there are controlled the conditional signal of incoincidency 32, or by the conditional signal of coincidency 33 of the inputs of the initiating decoder 34. A special case of the students reaction arises on pushing down the pushbutton $a'_{k+1}$ bearing the mark of interrogation. In this case the individual gives up his choice, and the signal $a_{k+1}$ is applied across the fourth gate of operation state 75, which is controlled by the operating-state signal 17, directly to the initiating decoder 34 which evaluates the Boolean relation:

$Y_{25} = \overline{h}_2 \cdot X_{33} + h_2 X_{32} + \overline{h}_2 \cdot \overline{h}_3 \cdot a_{k+1} \cdot X_{17}$
$Y_{24} = h_2 \cdot X_{33}$ (3)
$Y_{23} = h_3 (X_{32} + a_{k+1} \cdot X_{17})$ and puts into operation the actuating part of the stepping unit 5, should a new step of the program be necessary. The inputs $a_{k+2}$, or $a_{k+3}$ allow the student the shifting over, either to the following, or to the foregoing memory cell of the control memory unit 7, if there is met some of the relation of the free shifting decoder 18:

$Y_{19} = a_{k+2}(g_{k+2} + \overline{X}_{17})$ (4)
$Y_{20} = a_{k+3}(g_{k+3} + \overline{X}_{17})$ on which each step is created by one tact. Joining of several steps into one cycle is effected either by the forward step permitting circuit 28, or by the backward step permitting circuit 29, if $h_4 \cdot X_{17} + X_{37} = 1$ (5)

The output of the said circuits for permitting forward step or backward step enter either into the forward motion permitting circuit, or backward motion permitting circuit 35 of the actuating part 22 of the stepping unit 5. At the begin of each step the stepping signal 41 opens the main evaluating gate 78, which results in evaluation of the quality of the student's response either on the counter of correct responses 76, or on the counter of wrong responses 77, if there is met the condition that $Y_{76} = X_{31} \cdot X_{41} \cdot h_1$ (6)
$Y_{77} = X_{41} \cdot h_1 \cdot (X_{30} + a_{k+1} \cdot X_{17})$ The actuating part 22 of the stepping unit 5 is connected with the initiating decoder 34 by means of three signal channels, namely by the first initiating signal 23, by the second initiating signal 24, and by the third initiating signal 25, which are gated by the stepping signal 41 by means of a system of the three stepping gates, namely by the first stepping gate 44, by the second stepping gate 45, and by the third stepping gate 46. The output of the stepping gates 44 and 45 sets on the backward step memory 47 and the forward step memory 48, on which there are registered the commands for effecting one step. The passage of the signal $h_5$, or $h_6$ respectively, either across the forward step gate 50, or across the backward step gate 51 sets off either the forward step memory 48 or the backward step memory 47, which means the end of one step, after which the first stepping gate 44, the second stepping gate 45 and the third stepping gate 46 open in order to evaluate the condition of a new step. If one of the memories, either the backward step memory 47, or the forward step memory 48 set to state "1," then the step blocking circuit 58 closes the first, second and third stepping gate 44, 45 and 46, for the whole period of one step.

The output of the backward step memory 47, or of the forward step memory 48 is connected either to the input of the backward motion permitting circuit 36, or to the input of the forward motion permitting circuit 35. The third initiating signal 25 is applied across the third stepping gate into the forward motion permitting circuit 35 initiating a step which is formed by only one tact by means of one-impulse excitation of the tacting unit 6.

The tacting unit 6 according to FIG. 4 provides the shifting in the control memory unit 7 either by one cell forward, or by one cell backward, which depends on the state of the backward start memory 52, or on the forward start memory 53. Said memories are controlled by the output of the backward motion permitting circuit 36, or by the forward motion permitting circuit 35, across the backward tacting gate 54, or the forward tacting gate 55. The output either of the backward tact memory 52, or of the forward tact memory 53 form the signal channel of the backward operation signal 83, or forward operation signal 84 which control the movement of motors providing the motion of the film either in the forward, or in the backward direction. The zero-setting either of the backward tact memory 52, or of the forward tact memory 53 is effected always after one tact is done, as has been above explained, namely by means of signals $h_{10}$, $h_9$ from the control memory unit 7. If a tact "forward" or a tact "backward" is effected a signal arises on the output of the tact signalizing circuit 56 by means of which there is closed either the forward step gate 50, or the backward step gate 51, besides over the tact blocking circuits 57 there is closed either the backward tacting gate 54, or the forward tacting gate 55, and across the step-blocking circuit 58 there are closed the first stepping gate 44, the second stepping gate 45 and the third stepping gate 46 as long as either the backward tact memory 52, or the forward tact memory 53 is excited. As soon as the tacting signal $h_9$, or $h_{10}$ arrives from the control memory unit 7, either the forward tact memory 53 or the backward tact memory 52 is set to zero, the forward step gate 50, or the backward step gate 51 will open, thereby opening the channels either for the signal $h_5$, or for the signal $h_6$ from the control memory unit 7, said signals being able to set to zero either the forward step memory 48, or the backward step memory 47 thus terminating one step. So far the zero-setting either of the forward step memory 47, or of the backward step memory 48 does not take place, the operation goes on with a following tact: after the arrival of the signal $h_9$, or $h_{10}$ the tacting forward gate 55, or the backward tacting gate 54 will open, with the delay $T_1$ and according to the state of the actuating part 22 of the stepping unit another excitation of the tacting unit for a new tact takes place. The sequence of the tact, that is for one step is finished either by the signal $h_5$, or by the signal $h_6$, after which there follows the opening of the first stepping gate 44, of the second stepping gate 45, and of the third stepping gate 46 which brings about the evaluation of conditions for a new step. As long as the signal $h_4$ arrives from the control memory unit 7, the basic decision decoder 14 and the initiating decoder 34 are interconnected either by the conditional signal of incoincidency 32, or by the conditional signal of coincidency 33. Then another comparison of the student's choice register 11 of the basic decision unit 4 with the signals $g_i$ from the control memory unit 7 takes place, and after processing in the basic decision decoder 14 and in the initiating decoder 34 the actuating part 22 becomes excited to a new step. The output of the tact signalizing circuit 56 of the tacting unit 6 is furtheron processed by the operating-time control unit 59, on the output of which there is the logical "1" for the period of $\tau_2$ since the beginning of each tact. As $\tau_2$ is greater than the period of one tact, there is on the output of the operating-time control unit 51 constantly the logic "1" for the period of all tacts of the given cycle. Only after the period $\tau_2$ since begin of the last tact in the cycle, the output of the operating-time control unit will change to logic "0." Thus all the student's choice registers 11 are set by the signal of the operating cycle's end 12 to zero, and at the same time the setoff input gates open to receive student's new reaction from the input unit 1. The new reaction of the student implies a new cycle.

The selector 2, shown in FIG. 4 is formed by a row of bistable registers, namely by the first register of operating state 61, by the second register of operating state 62, and by the fast free shifting register 63, of the second two, which being actuated by the student. The value of the first register of operating state 61 may be changed by the teacher so as to open the operating state gate 64 for the signal from the second register of the operating state 62, by means of the later the student may induce the operating mode of "free shifting." By means of the first operational state gate 15, second operational-state gate 16, third operational-state gate 38 and fourth operational-state gate 77 the decision system 3 is made unsensitive to all signals from the control memory unit 7, except the tacting signal $h_9$, $h_{10}$. At the same time there are opened for commands the signal channels $a_{k+2}$, $a_{k+3}$ in the free shifting decoder 18, which may excite across the forward step permitting circuit 28, or across the backward step permitting circuit 29 the tacting unit 6. In the case of free shifting the free shifting register can be used by the student for excitation of a forward step permitting circuit 28, or of a backward step permitting circuit 29, thus creating a series of steps, that means of a cycle, on the base of the student's choice register, $11_{k+2}$, $11_{k+3}$ resp. as long as the cycle is not terminated by a change of the fast free shifting register's state 63.

The peripheral memory unit 8 shown in FIG. 2 contains the peripheral memory control unit 9 and besides some more peripheral control units 10. The selective signal $h_7$, corresponding to some of the peripheral control units 10 passes through a coupled gate of peripheral device 66 which is controlled by the stepping signal 41 and by the operating state signal 17 of the operation mode. In the case of coincidence the memory element of a proper complementary device is set into the state "1," and its output provides the selection of an information block from the corresponding periphery device 10. At the same time this signal is applied to the tact-blocking circuit 57, thus blocking further tacting of the control memory unit 7 during the operation of the periphery memory unit 8. Having received the entire block of information a stop-signal of the periphery memories 68 is transmitted into the corresponding peripheral memory control register 67. By zero-setting of the peripheral memory control register 67 a signal is transmitted across the second shaping member 69 and across the periphery memory reaction gate 70, controlled by the signal $h_8$ from the control memory unit 7 which results in the excitation of the forward tact memory 53 in the forward motion permitting circuit 35.

The behavior of the logical system resides in finding out a certain cell and presenting the information from this cell to the student. For finding out the cell, associative selection is carried out, that means that the transition from the cell A of the memory medium to the cell B is not determined by the address of the cell B, but the cell B is found out in the memory medium by a gradual evaluating of a part of information, storaged in the individual cells of the memory medium on the chain of transitions between the cells A and B, inclusive the evaluation of the cells A and B. In each cell of the control memory unit there is storaged an information addressed to the student and moreover an instruction word containing:

tacting instructions $h_9$, $h_{10}$, instructions for evaluation of student's reaction $g_1$ to $g_{k+3}$, instruction for condition of the forward motion $h_2$, instruction for meeting the forward condition $h_5$, instruction for condition of the backward motion $h_3$, instruction for meeting the backward condition $h_6$, instructions for a new step $h_4$, instructions for evoking a selection of information from the peripheral control memory unit $h_{71}$ to $h_{7k}$, instruction for a new tact after the termination of selection from the periphery memory $h_8$.

Following description elucidates the function of the teaching machine according to this invention from the point of view of a practical activity with regard to the processes running in the logical circuits:

Input signals:

$a_1$—$a_k$: provides information concerning the student's reactions when he is operating the individual signal pushbuttons, and the pushbuttons of the keyboard producing selected responses. On pushing down one of these pushbuttons, one, and only one signal $a_t$ produces the value of logical "1."

$a_{k+1}$: the signal of interrogation mark pushbutton.

$a_{k+2}$: the pushbutton of forward motion.

$a_{k+3}$: the pushbutton of backward motion.

The choice of operational state:

b: inside switch of the logical circuit (not accessible to the student(, c: outside switch of the logical circuits, d: the fast shifting switch.

The total inside state of the logic system is given by the state of the forward tact memory 53, of the backward tact memory 52 of the forward step memory 48 of the backward step memory 47 and of the peripheral memory control register 67.

The following combinations of individual memories represent a concrete significance:

| Individual kinds of memories | | | | | | |
|---|---|---|---|---|---|---|
| 53 | 52 | 48 | 47 | 67 | $S_k$ | their significance |
| 0 | 0 | 0 | 0 | 0 | $S_0$ | stillstand |
| 1 | 0 | 0 | 0 | 0 | $S_1$ | follows a shift of the film by one memory cell, that means one forward branching (condition of a forward step) |
| 1 | 0 | 1 | 0 | 0 | $S_2$ | unstable state between $S_0$ and $S_2$; if $h_6=0$, then follows transition in the state $S_2$ if $h_6=1$ then in the state $S_0$ |
| 0 | 0 | 1 | 0 | 0 | $S_3$ | |
| 0 | b 1 | 0 | 1 | 0 | $S_4$ | backward branching (condition of a backward step) |
| 0 | 0 | 0 | 1 | 0 | $S_5$ | unstable state between $S_0$ and $S_6$; if $h_6=1$, then the system turns in the $S_0$ state, if $h_6=0$, then results the state $S_6$ |
| 0 | 0 | 0 | 0 | 1 | $S_7$ | the choice of the information from the magnetic memory |
| 0 | 1 | 0 | 0 | 0 | $S_4$ | follows the movement of the film by one memory cell backward (a backward tact) |

The individual reactions of the student are storaged on the student's choice register 11. This allows that on that cells where the photosignal $h_4=1$ a repeated evaluation of the proper conjunction $a_t \cdot g_t$ takes place by which starts a new step. With regard to the above-mentioned registers 11, each of the basic states $S_0$ to $S_6$ is modified by the value of the proper input signal $a_t$. Therefore the states shown in the diagram in FIG. 5 have been provided with the index "$t$" and the proper part of this diagram would $k$-times appear in complete diagram with all its relations. Analogically also the registers 61, 62, 63 have a character of memory element and change the inside state of the system.

Figure 5:
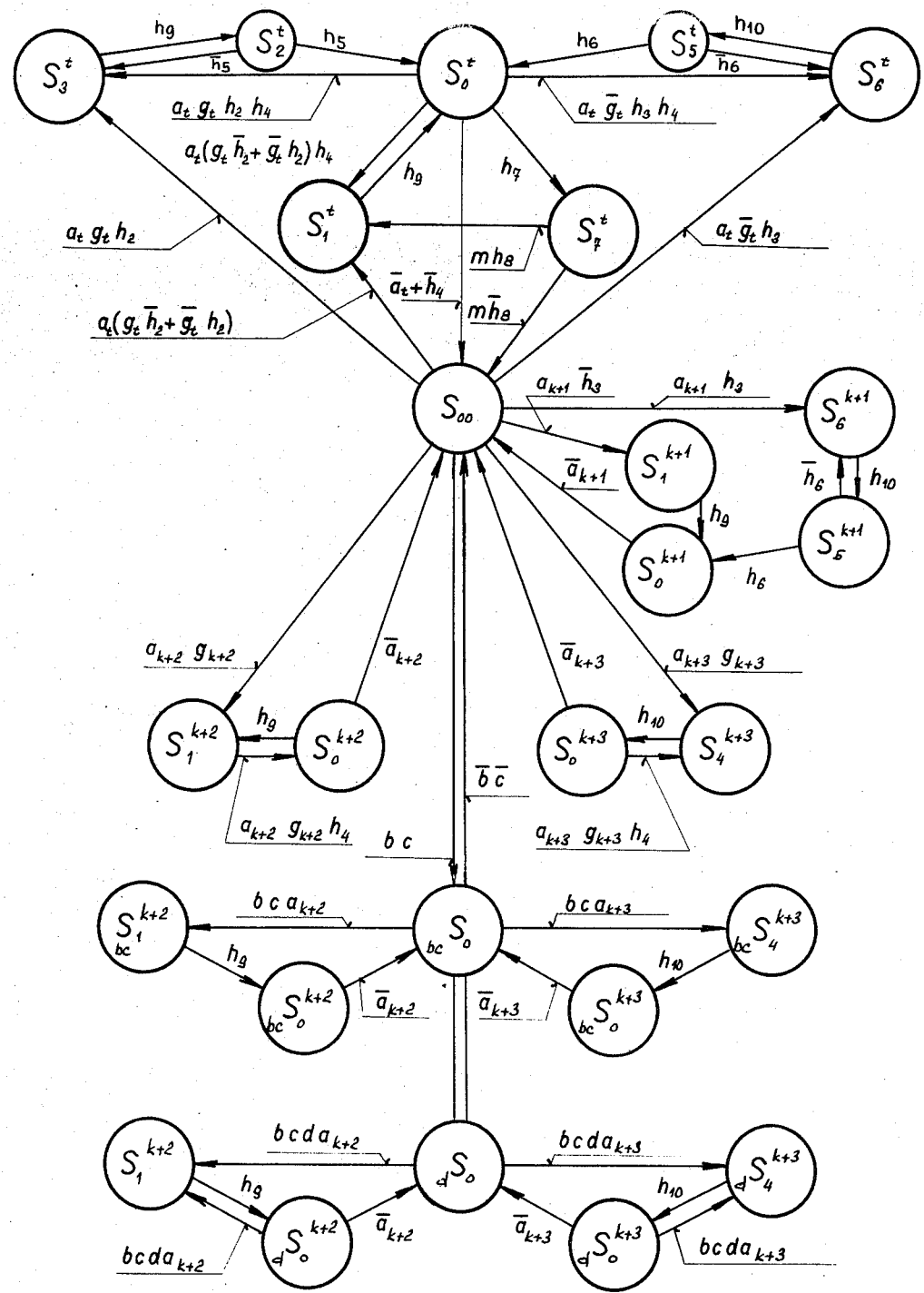
FIG. 5 represents a diagram illustrating individual states of one process.
Figure 6:
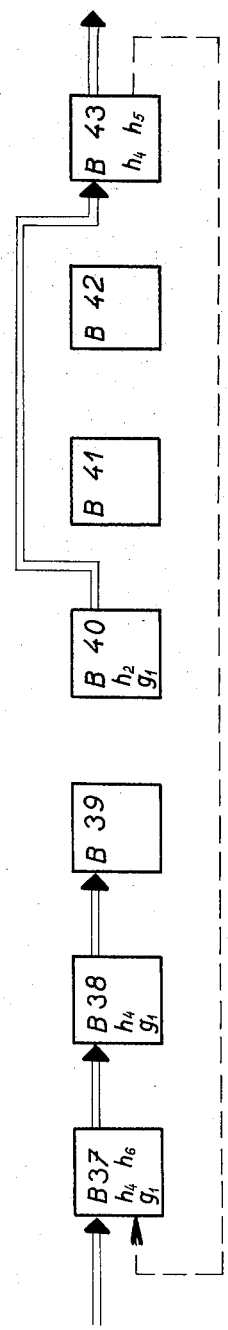
FIG. 6 illustrates an example of one process.
Figure 7:
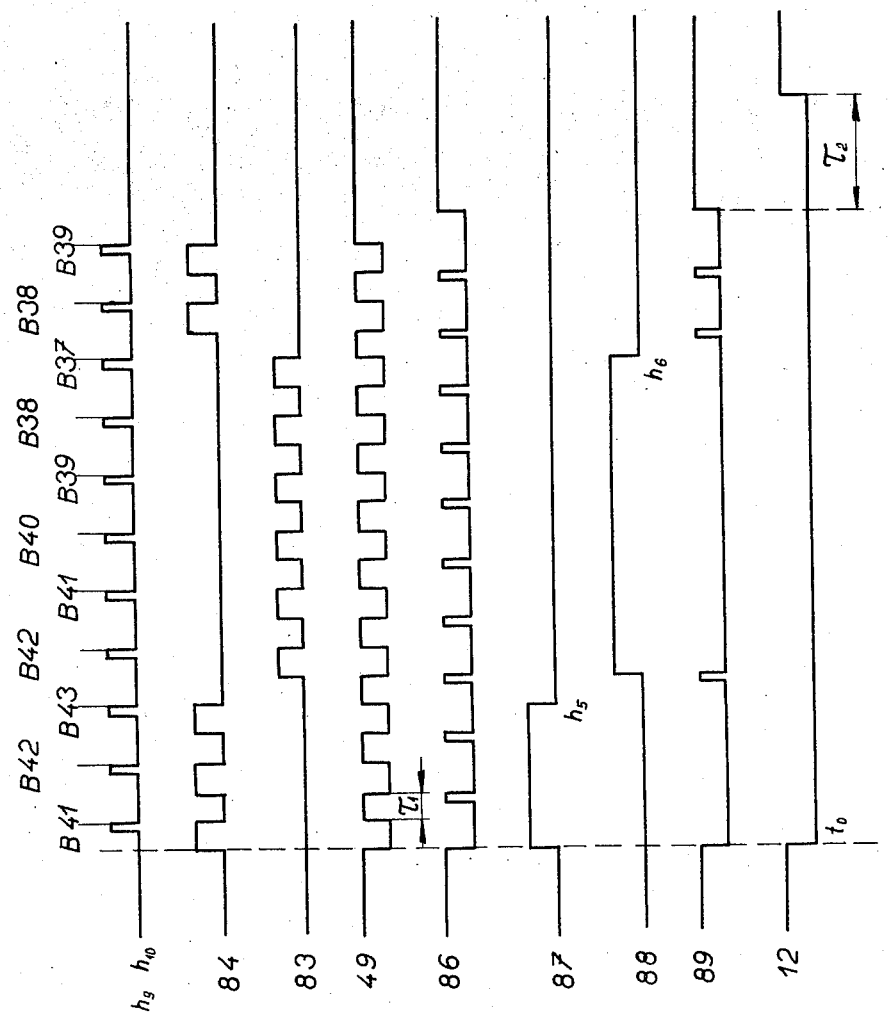
FIG. 7 represents a time diagram illustrating the coordination of logical circuits of the device.
Figure 8:
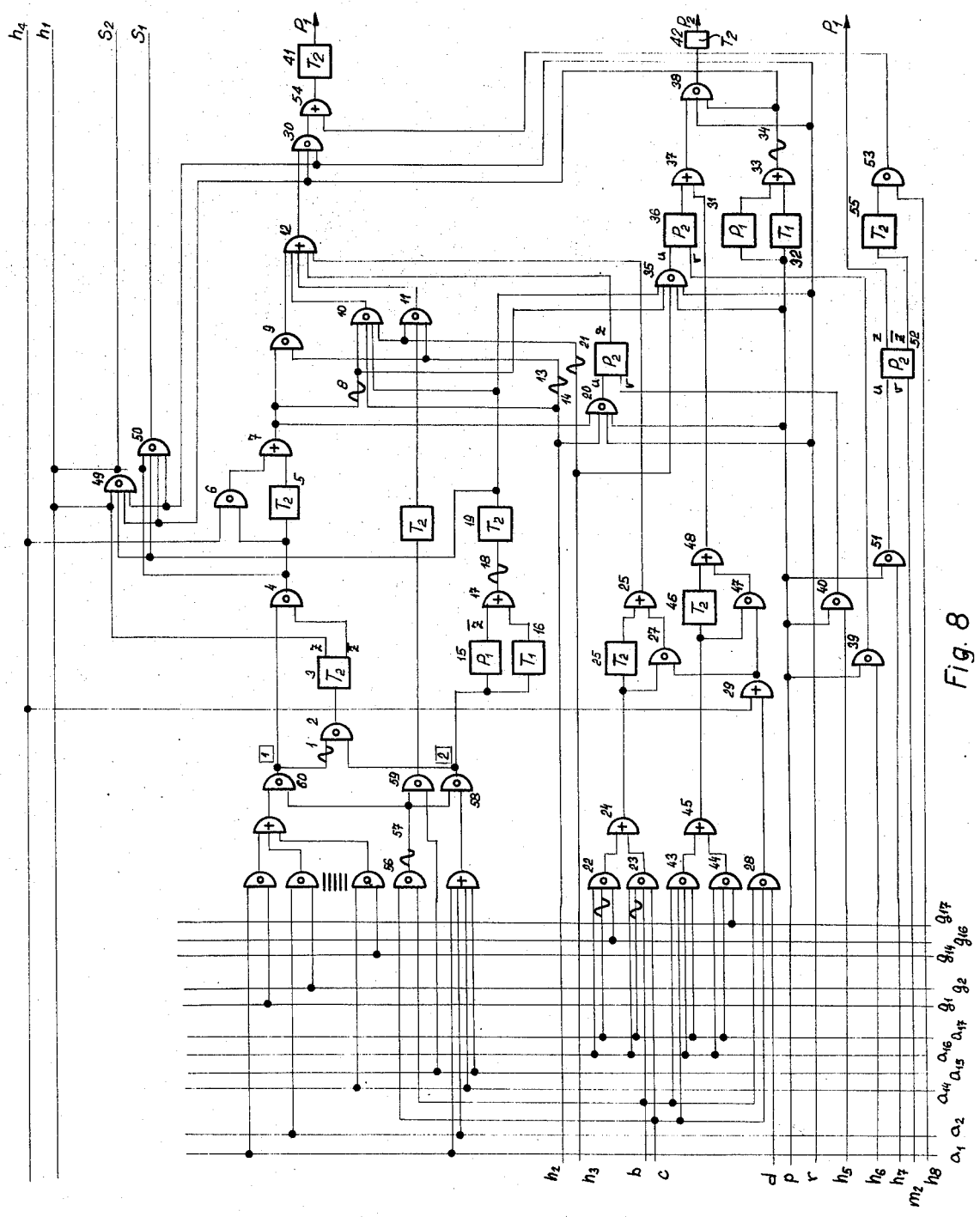
FIG. 8 represents an embodiment of an electronic diagram of the control and decision part by the logical diagram shown in FIG. 4.

The diagram of behavior according to FIG. 5:

The stillstand is $S_{00}$. At the reaction of the student $a_t$ the system turns over into a certain branch of the diagram, the states of which are marked by the indexes "$t$." In total there is a $k$-number of such branches for a $k$-number of different inputs $a_t$. If there is met the logic condition $a_t \cdot (g_t \cdot \overline{h}_2 + \overline{g}_t \cdot h_2)=1$, at transition into the state $S_1{}^t$ follows, that means that the film strip begins to run in the forward direction, namely in the direction to the memory cells having a higher order of number. The signal $h_9$ involves in the following cell a stop of the motion and the system turns over into the state $S_0{}^t$. In the case of $\overline{a}_4 + \overline{h}_4 = 1$, the system turns over into the state $S_{00}$.

If on the next reaction of the student there is met the condition $a_t \cdot g_t \cdot h_4 = 1$, the system turns over into the state $S_2{}^t$, and the filmstrip starts to move forward. On a shift by one cell, that means $h_6=1$, the system turn over into the state $S_3{}^t$, and the evaluation of the signal $h_5$ takes place, which represents the end of the branching. If $\overline{h}_5=1$, then the system returns into the state $S_2{}^t$, and the forward motion goes on. Thus arises a series of mutual transitions between the states $S_3{}^t$ and $S_2{}^t$ which lasts as long as on some cell the result $h_5=1$ is realized. Then the system turns into the state $S_0{}^t$ over, and should also $\overline{a}_t + \overline{h}_4 = 1$, then the system returns into the state $S_{00}$. Should the following reaction be $a_t \cdot \overline{g}_t \cdot h_3 = 1$, then the system turns into the state $S_5{}^t$ over, that means forward and backward branching, and there follows the backward motion of the film. After the shifting by one cell is finished, which means that $h_{10}=1$ it is evident that the system turns over into the $S_5{}^t$ state, on which there takes place the evaluation of the signal value $h_6$, that is the end of backward branching. If $\overline{h}_6=1$, then follows the backward motion in the state $S_6{}^t$. Then a series of mutual transitions between the states $S_5{}^t$ and $S_6{}^t$ arises, which lasts as long as one cell reaches the value $h_6=1$. Then the system turns over into the state $S_0{}^t$, to the state $S_{00}$.

The above described transitions are based on the consideration that $h_4$ equals to zero, and the state $S_0{}^t$ always returns into the state $S_{00}$. However, if $h_4=1$ in the case when the system is in the state $S_3{}^t$, then repeatingly follows a transition in one of the states $S_1{}^t$, $S_3{}^t$ or $S_6{}^t$, regardless how the system arrived in the state $S_0{}^t$. Then repeatingly takes place the evaluation of the conditions for transition into one of the states $S_1{}^t$, $S_3{}^t$ and $S_6{}^t$ as in the foregoing case, however on the transition from the state $S_0{}^t$ must be $h_4=1$.

In the case the system arrived in the state $S_0{}^t$ and from the corresponding cell arrived the signal $h_7=1$, the system turns over into the state $S_7{}^t$ which represents the start of the tape recorder, and the control is taken over by the second trace on the tape. After the reproduction of a certain information block, the course of the tape recorder is stopped by the signal from the periphery memory unit 8, and the system may either return in the state $S_{00}$, supposing $h_6=0$, or the film is shifted by one cell forward by the transition in the state $S_1{}^t$, if $h_8=1$.

On pushing down the pushbutton of the interrogation "?" ($a_{k+1}$) two different reactions may take place. If $a_{k+1} \cdot \overline{h}_3 = 1$ the film is shifted by one cell in a forward direction. If $a_{k+1} \cdot h_3 = 1$, the system turns over into the state $S_6{}^{k+1}$, which is followed by a backward branching, which is effected by a series of transitions between $S_6{}^{k+1}$ and $S_5{}^k{}_{+1}$ as long as one of the cells arrives the value $h_6=0$, and as consequently the system does not return into the state $S_{00}$.

In the case the pushbutton $a_{k+2}$ is pressed down and the algorithm allows the forward motion $e \cdot g_0 \cdot g_{k+2} = 1$, then the system turns over into the state $S_1{}^{k+2}$, and the film is shifted by one cell forward. In the state $S_0{}^{k+2}$ the evaluation of $a_{k+2} \cdot g_{k+2} \cdot h_4 = 1$ takes place. When the condition is met with there follows the return in the state $S_1{}^{k+2}$ and one shift by the next cell. If $a_{k+2}=0$, the system returns into the stillstand. Analogically is effected the backward movement at $a_{k+3} g_{k+3} = 1$, where the system passes among the states $S_{00}$, $S_4$ and $S_0$. Should be allowed by the teacher the free shifting $b=1$, and the student makes use of this offer, e·g, $c=1$ then the system turns over into the state $_{bc}S_0$. Should the system be in this state, then the shifting is possible only by the inputs $a_{16}$ and $a_{17}$. If $b \cdot c = 1$ and the fast free shifting $d=1$ is switched on, a repeated forward shifting or backward shifting takes place as long as $d=1$, whereby there arise mutual transitions between $_dS_0$ and $_dS_0{}^{k+2}$, or between $_dS_0$ and $_dS_2{}^{k+3}$.

The above diagram, illustrating individual states of one process is comparatively simplified, and it does not contain such examples as for instance a situation when more of the pushbuttons were pressed down at the same time, which is automatically avoided by the arrangement of the teaching device.

The function of the teaching machine according to the invention may be expressed with respect to the logical system in mathematical way. In the following description there is used common marking of characteristics of the cells in the control memory unit. The marking of individual cells is accompanied by the order-number "$j$" which allows the combination of significance and values.

$h_2{}^{(j)}$ takes the value 1 or 0

$h_3^{(j)}$ takes the value 1 or 0; a combination of these characteristics determines the kind of instruction on the jth cell of the memory medium $h_2^{(j)}=0, h_3^{(j)}=0$    linear program
$h_2^{(j)}=1, h_3^{(j)}=0$    forward branching
$h_2^{(j)}=0, h_3^{(j)}=1$    backward branching
$h_2^{(j)}=1, h_3^{(j)}=1$    forward-backward branching $\{g_t\}^{(j)}$ is a set of $k$ signals taking the values 0 and 1 for evaluation of the quality of students reaction $h_4^{(j)} = \begin{cases} 1 \text{—permission of a new step} \\ 0 \text{—end of the operating cycle} \end{cases}$ $h_5^{(j)} = \begin{cases} 0 \text{—if the j-th frame allows further forward motion on branching} \\ 1 \text{—if on the j-th frame the forward branching is terminated} \end{cases}$ $h_6^{(j)} = \begin{cases} 0 \text{—if the j-th frame allows further backward motion on branching} \\ 1 \text{—if on the j-th frame the backward branching is terminated} \end{cases}$ Calculation of automatical program shifting at switched-on logical network, that is when $b \cdot c = 0$.

In this part of description the shifting of memory medium by one step is described, said step being formed by one or more tacts. Each tact represents shifting of memory medium by one cell.

The automatic shifting of the program for the jth cell may be expressed by an integer $f^{(j)}$). In the cell there is registered the students reaction, the kind of instruction, and its comparison with $g_k$ signals. By algebraic addition of said integer to the order number of the starting cell "$j$" the order number of that cell is achieved the shifting is terminated, that is the value $j+f^{(j)}$, which may be greater than "$j$" at the forward motion, smaller than "$j$" at the backward motion, or equal to "$j$" in the case of zero-shifting.

The length and the direction of the shifting by one step depends on following stimulations:
a. on the kind of instruction on the jth cell, that is, on the values $h_2^{(j)}, h_3^{(j)}$
b. on the values of characteristic $h_5, h_6$ on the neighboring cells
c. on the student's reaction $a_t(t\epsilon\{1, 2, \ldots k+3\})$,
d. on the code $g_t^{(j)}$ of the jth cell.

In the following formula $t_a$ is the order number of the reaction quality $a_t$ of the student, $t_g$ is the order number of signal $g_t$ for evaluation of the reaction quality of the student. Their mutual comparison is expressed by the quantity $\delta^{(j,t)}$ representing the sign of coincidency and taking the value 1 or 0 as prescribed $$\delta^{(j,t)} = \frac{1}{d^{(j,t)}+1} \text{ for } t\epsilon\{1, 2, \ldots k, k+2, k+3\}$$

where $$d^{(j,t)} = \min_{g\epsilon\{g_t\}^{(j)}} |t_g - t_a|$$

is the minimum absolute difference between the individual signals of the set $\{g_t\}^{(j)}$ and the reactions $\{a_t\}^{(j)}$ of the student, and $$\left[\frac{1}{d^{(j,t)}+1}\right]$$

is the so called integer of $$\frac{1}{d^{(j,t)}+1}$$

conditioning the set $d^{(j,t)}$ either to 0 or to 1 of the set $\delta^{(j,t)}$ The shifting $f^{(j)}$ may now be expressed as a function of the sets $h_2^{(j)}, h_3^{(j)}, h_5^{(j+1)}, h_5^{(j+2)}, \ldots h_6^{(j11)}, h_6^{(j12)} \ldots \delta^{(j,t)}$ for $t\epsilon\{1,2,\ldots k\}$ by means of the formula $f^{(j)} = \delta \cdot \{1 + h_2 \cdot [(1-h_5^{(j+1)}) + (1-h_5^{(j+1)})(1-h_5^{(j+2)}) \ldots + (1-h_5^{(j+1)})(1-h_5^{(j+2)})(1-h_5^{(j+3)}) + \ldots]\} + (1-\delta) \cdot h_2(1-h_3) - h_3[1 + (1-h_6^{(j-1)}) + (1-h_6^{(j-1)})(1-h_6^{(j-2)}) + (1-h_6^{(j-1)})(1-h_6^{(j-2)})(1-h_6^{(j-3)}) + \ldots]$ As at $h_2^{(j)}, h_3^{(j)}, \delta^{(j,t)}$ no error can occur, the upper indexes have been omitted.

For $t=k+1$ there is true:
$f^{(j)} = a_{k+1}^{(j)}\{(1-h_3) - h_3[1+h_6^{(j-1)}) + (1-h_6^{(j-1)})$
$(1-h_6^{(j-2)}) + (1-h_6^{(j-1)})(1-h_6^{(j-2)})(1-h_6^{(j-3)}) \ldots ]\}$ For $t=k+2$ there is true: $f^{(j)} = -\delta^{(j,t)}$. For $t=k+3$ there is true: $f^{(j)} = -\delta^{(j,t)}$.

From the above there follows, that by means of the function $f^{(j)}$ it is possible to determine the individual automatic shiftings of the memory medium after the execution of one step. In order to carry out another step a new reaction of the student is not always necessary due to the existence of the characteristic $h_4^{(j)}$. The shifting of a memory medium from the point of view of the student, that is the shifting from the cell on which the student has chosen his response to the cell, on which another reaction is required, is created by a cycle of steps. This cycle may be terminated only by a zero value of $h_4$, or of "$f$" on some of the cells. Exception is made at the value of the response where $t=k+1$, where there always only one step is exhibited and the motion stops at $h_4^{(2)}=0$.

Supposing the student selects the $a_t$ on the cell having the order number $j_0$, then the length and the direction of the total shifting $P(j_0,t)$ will again be expressed as an integer, by the adding of which to the order number of the starting cell, the order number of that end-cell is obtained on which the memory medium is stopped after one cycle, in order to register the student's next response. The total cycle is given by the relation:

$P(j_0,t) = F^{(1)} + H_4^{(2)} \cdot F^{(2)} + H_4^{(2)} \cdot H_4^{(3)} \cdot F^{(3)}$
$H_4^{(2)} \cdot H_4^{(3)} \cdot H_4^{(4)} \cdot F_4 + \ldots,$ where the index $i=1, 2, 3\ldots$ now determines the order of the executed step of the function $F^{(i)}(i=1,2,\ldots)$ on executing the jth step of the cycle, that means in detail:

$F^{(1)} = f^{(j_0)}$ $F^{(2)} = f^{(j_0+F^{(1)})}$ $F^{(3)} = f^{(j_0+F^{(1)}+H_4^{(2)}F_2)}$

In the case of $t\epsilon\{k+2, k+3\}$ alternative formula for $f^{(j)}$ should be used.

The sign $H_4^{(i)}$ ($i=2,3,\ldots$) executes the characteristic $h_4$ on that cell, on which there is executed the $i$th -the instruction, namely:

$H_4^{(2)} = h_4^{(j_0+F^{(1)})}$ $H_4^{(3)} = h_4^{(j_0+F^{(1)}+H_4^{(2)} \cdot F^{(2)})}$ etc.

As soon as for the first time the zero value $h_4$ appears, the cyclus is terminated.

On summarizing the foregoing part of the description, it may be said that the total cycle of the memory medium from one response to the next one may be determined by the formula $P(j_0,t)$. This shifting is composed of a cycle of steps, given by the formula $f^{(j)}$. Before each step there is repeatingly read the genuine response, so far $h_4^{(j)}$ of the proper cell equals to 1. As soon as the said sign is for the first time equal to 0, the cycle is terminated and the next operation of the teaching machine is controlled by the instruction storaged in the memory of the proper cell.

Calculation of automatical program shifting at switched-off logical network, that is when $b \cdot c = 1$:

The automatic shifting from the cell, having the order number "$j$," the length and direction of which having the same sense as in the foregoing example is now marked by the sign $G^{(j)}$. The symbol $n_d$ now designates the number of cells during the passage of which there was $d=1$.

The calculation is very simple, and for its illustration following table will do:

| | |
|---|---|
| the pushbutton of the response $t$ 1,2,...$k+1$ | ...$G^{(j)}=0$ always |
| the pushbutton of the response $t=k+2$ and $d=1$ | ...$G^{(j)}=n_d$ |
| the pushbutton of the response $t=k+2$ and $d=0$ | ...$G^{(j)}=1$ |
| the pushbutton of the response $t=k+3$ and $d=1$ | ...$G^{(j)}=-n_d$ |
| the pushbutton of the response $t=k+3$ and $d=0$ | ...$G^{(j)}=-1$ |

The student's reactions reside in this system in actuating pushbuttons, on the one hand for selective responses for which there are offered the possibilities of these responses, on the projecting screen and, on the other hand, in actuating pushbuttons of the typewriterlike keyboard, inclusive all remaining signs and symbols which may be introduced with regard to the teaching requirements. The combination of both kinds of pushbuttons offers the possibility of a broad choice of responses. For simple shifting of the film either in forward, or in backward direction in that parts of program where this is necessary, two pushbuttons are used which are situated on the right side of the keyboard.

In the case the student is at loss about his answer and does not want to choose accidentally, he has the possibility to use in any place of the program the interrogation pushbutton "?", by the use of which the program is shifted to another cell of the program, where he gets a partial or a complete response or explanation.

From outside the teaching machine is provided with a switch, which is accessible to the student, and by means of which the picking up of the codes and instructions may be switched out, which allows on actuating the FORWARD, or the BACKWARD pushbutton, an arbitrary free shifting through the memory medium in both directions.

By using the switch "d" it is possible to switch on so called fast-free shifting of the film which is executed when the FORWARD, or BACKWARD pushbutton is pressed down, which is possible only when the "c" switch is switched on. The outer switch "c" may be diverted of operation by means of the switch "b," which is not accessible to the student.

The informations which are determined to the student are carried together with control-signals on the memory medium of the control memory unit, as for instance, on a film, etc. The controlling signals are picked up by a system of sensors and delivered for processing into the decision system 3 shown in FIG. 2, while the second part of the information from each memory cell is presented to the student, for instance in the form of display on the projecting screen. The searching of the final cell is executed by shifting the memory medium, said process being controlled by signals from the decision system 3. Said signals also control the selection of block of information from the periphery memory unit 8, for example the sonic information from the tape recorder, and the visual information of the film projector, etc. In the described example the control memory unit is represented by a 35 mm. diafilm, each frame of which represents one memory cell, carrying on the one hand, information to be projected to the student on the projecting screen, and on the other hand, binar controlling signals which are picked up by the photosensors 95.

The teaching machine according to the invention controls automatically not only the correctness of the selective responses, but even the correctness of created responses which are composed of all elements of alphabetical and numerical keyboard with all complementing signs and symbols. The combination of all available elements of selective responses and created responses offers the most convenient possibilities. So it is possible to present not only linear programs of Skinner- or Pressey-type, or programs of Crowder- and Shefield-type, but even their combinations. Due to that it is now possible to produce all possibilities of new programs, permitting a full control and proceeding through the program. The algorithm of the program may be even of non NARKOV'S type. Due to this fact it is possible not only to produce new ambitious programs but also easily to transform all hitherto existing programs for different teaching machines, inclusive the book-programs and programs storaged on cards.

The function of the teaching machine according to the invention may be changed in contradistinction to hitherto known teaching machines according to the desired function, as for instance teacher, adviser, examiner, trainer, repetitor and stimulator, as the programs to be operated may have the very same character. In combination with a tape recorder the teaching machine presents audiovisual programs with feedback, diafon lections, and programs for language laboratories. In connection with a projector they may be presented dynamic audiovisual informations, combined with a feedback arrangement for evaluating the student's reactions. The teaching machine according to the invention represents the synthesis not only of all hitherto known devices, but also all requirements of program teaching and learning in one, universal device.

The higher effectivity resides in the possibility of preparing programs complying with all pedagogical requirements in any convenient combination of visual and sonic information. It presents all kinds of programs of their combinations as well as of all kinds of responses produced by all pushbuttons of it, with regard to pedagogical and psychological point of view. The proper programming is much easier than in the case of most hitherto known teaching machines.

We claim:

1. A universal adaptive audiovisual teaching device, comprising:
    visual display means;
    sound-reproducing means;
    input means providing a response to said visual display and sound-reproducing means, comprising pushbutton means adapted to be operated by a user;
    selector means having an output and an input connected to said pushbutton means;
    decision means connected to said pushbutton means, said decision means comprising basic decision means for evaluating the correct response of said user, said basic decision means having an output and inputs of which one input is connected to said pushbutton means, said decision means providing an evaluating signal of correct response of the user and an evaluating signal of incorrect response of said user, stepping means for receiving said evaluating signals having an output and inputs of which one input is connected to the output of said basic decision means and tacting means having outputs and inputs of which one input is connected to the output of said stepping means;
    peripheral memory means having inputs and an output connected to said visual display means and said sound-reproducing means, the output of said selector means being connected in common to an input of said peripheral memory means and inputs of each of the basic decision means, the stepping means and the tacting means of said decision means; and
    control memory means having a medium, an input connected to an output of the tacting means of said decision means, an output connected to said visual display means and an output connected in common to an input of said peripheral memory means and inputs of each of the basic decision means, the stepping means and the tacting means of said decision means.

2. A universal adaptive audiovisual teaching device as claimed in claim 10, wherein said decision means comprises a plurality of stepping gate means and setoff input gate means, and wherein an output of the tacting means of said decision means is connected via a plurality of said stepping gate means to an input of the stepping means of said decision means and via a plurality of said setoff input gate means to an input of the basic decision means of said decision means.

3. A universal adaptive audiovisual teaching device as claimed in claim 1, wherein said selector means comprises user's selection register means and a plurality of setoff input gate means connecting said pushbutton means to said user's selection register means via a plurality of said setoff input gate means, said user's selection register means having a plurality of inputs and outputs, and wherein said decision means comprises basic decision decoder means having an output and an input connected to an output of said control memory means and to the outputs of said user's selection register means, a pair of operational-state gate means connected to and controlled by said selector means, the output of said basic decision decoder means being connected to an input of said stepping means via said pair of operation-state gate means, free shifting decoder means for providing free shifting forward signals and free shifting backward signals, said free shifting decoder means having an output and inputs connected to said pushbutton means via a plurality of said setoff input gate means and to an output of said control memory means and to said selector means, the output of said free shifting decoder means being connected to an input of said stepping means, and wherein the tacting means of said decision means comprises operating time control means having an input and an output connected to each of said setoff input gate means and to the inputs of said user's selection register means.

4. A universal adaptive audiovisual teaching device as claimed in claim 3, wherein the stepping means of said decision means has an initiating part and an actuating part, the basic decision decoder means of said decision means providing coincidence and noncoincidence signals and supplying said signals to the initiating part of said stepping means, the free shifting decoder means of said decision means supplying its free shifting forward signals and free shifting backward signals to the initiating part of said stepping means, the output of said control memory means being connected to the initiating part of said stepping means, said selector means providing an operating-state signal and supplying said signal to the initiating part of said stepping means, said pushbutton means including a question button connected to the initiating part of said stepping means, said decision means providing an evaluating signal of correct response of the user and an evaluating signal of incorrect response of the user and supplying said signals to the initiating part of said stepping means, the initiating part of said stepping means having a plurality of outputs and the actuating part of said stepping means having a plurality of inputs connected to the outputs of said initiating part, the output of the tacting means of said decision means and outputs of said control memory means being connected to said inputs of the actuating part of said stepping means, said actuating part providing a forward actuating signal and a backward actuating signal and supplying said signals to an input of said tacting means.

5. A universal adaptive audiovisual teaching device as claimed in claim 4, wherein said selector means provides a rapid shifting signal and an operational-state signal and said control memory means provides a signal, said stepping means of said decision means comprises noncoincidence step permitting circuit means, coincidence step permitting circuit means, forward step permitting circuit means and backward step permitting circuit means for providing stepping of the medium of said control memory means, said noncoincidence step permitting circuit means being connected to an input of said basic decision decoder means and supplying the noncoincidence signal thereto, said coincidence step permitting circuit means being connected to an input of said basic decision decoder means and supplying the coincidence signal thereto, said free shifting decoder means supplying said free shifting forward signals and said free shifting backward signals to the input of said control memory means and to said actuating part, said decision means including first and second OR gates, a plurality of operatonal-state gates, an evaluating gate of correct response, an evaluating gate of incorrect response and initiating decoder means having inputs and outputs, said selector means being connected to an input of said second OR gate and supplying said rapid shifting signal thereto, said control memory means being connected to an input of said second OR gate and supplying its signal thereto via one of said operational-state gates, said selector means being connected to said one of said operation-state gates for supplying said operational-state signal thereto, said noncoincidence step permitting circuit means being connected to an input of said initiating decoder means for supplying said noncoincidence signal thereto, said coincidence step permitting circuit means being connected to an input of said initiating decoder means for supplying said coincidence signal thereto, said forward step permitting circuit means being connected to an input of the initiating part of said stepping means for supplying its signal thereto, said backward step permitting circuit means being connected to an input of the initiating part of said stepping means for supplying its signal thereto, said question button being connected to the initiating decoder means and the first OR gate of said decision means via another operational-state gate, said selector means being connected to said other operational-state gate and supplying said operational-state signal thereto, said noncoincidence step permitting circuit means being coupled to said first OR gate, said first OR gate controlling said evaluating signal of incorrect response via said evaluating gate of incorrect response and said evaluating signal of correct response via said evaluating gate of correct response, said control memory means being connected to and controlling the conductivity condition of each of said evaluating gate of incorrect response and said evaluating gate of correct response, each said evaluating gate having an input connected to an output of said control memory means and an input connected to the actuating part of said stepping means.

6. A universal adaptive audiovisual teaching device as claimed in claim 5, wherein three outputs of said initiating decoder means are connected to inputs of the actuating part of said stepping means, said decision means including a first stepping gate connected in a first of said outputs, a second stepping gate connected in a second of said outputs, a third stepping gate connected in a third of said outputs, a backward stepping gate, a forward stepping gate, forward motion permitting circuit means and backward motion permitting circuit means, said initiating decoder means supplying a first initiating signal via said first of said outputs and said first stepping gate, a second indicating signal via said second of said outputs and said second stepping gate and a third indicating signal via said third of said outputs and said third stepping gate, said decision means including a step blocking circuit connected to and controlling said stepping gates, a backward step memory and a forward step memory, each having a set input, a reset input, a set output and a reset output; said first and second stepping gates being connected to said backward and forward step memories, said third stepping gate having an output directly connected to said forward motion permitting circuit means, an output of said control memory means being connected to the reset input of said backward step memory via said backward stepping gate, an output of said control memory means being connected to the reset input of said forward step memory via said forward stepping gate, said tacting means being connected to and controlling the conductivity condition of said stepping gates, said backward step memory providing a backward actuating signal and being connected to said backward motion permitting circuit means and supplying said backward actuating signal thereto, said forward step memory providing a forward actuating signal and being connected to said forward motion permitting circuit means and supplying said forward actuating signal thereto, said peripheral memory means having an output connected to an input of said forward motion permitting circuit means, said forward step permitting circuit means having an output connected to an input of said forward motion permitting circuit means, said backward step permitting circuit means having an output connected to an input of said backward motion permitting circuit means.

7. A universal adaptive audiovisual teaching device as claimed in claim 6, wherein the tacting means of said decision means comprises a backward tact memory, a forward tact memory, each of said backward and forward tact memories having a set input, a reset input, a set output and a reset output, said backward tact memory providing a backward operational-signal and said forward tact memory providing a forward operational signal, a backward tacting gate, a forward tacting gate, tact-signalling circuit means and tact-blocking means, an output of the actuating part of said stepping means being connected to the set input of said backward tact memory via said backward tacting gate, an output of the actuating part of said stepping means being connected to the set input of said forward tact memory via said forward tacting gate, an output of said control memory means being directly connected to the reset input of said backward tact memory, an output of said control memory means being directly connected to the reset input of said forward tact memory, said tact-signalling circuit means being connected to and controlling the conductivity condition of each of said backward stepping gate and said forward stepping gate, wherein said control memory means has driving motor means for driving said control memory means, said backward tact memory being connected to the driving motor means of said control memory means and to said tact-signalling circuit means and supplying sad backward operational signal thereto, said forward tact memory being connected to the driving motor means of said control memory means and to said tact-signalling circuit means and supplying said forward operational signal thereto, each of said backward and forward tact memories being connected to the input of said operating time control means, the output of said operating time control means being connected to an input of the basic decision means of said decision means, an output of said tact-signalling circuit means being connected to an input of said tact-blocking means, and wherein said peripheral memory means includes peripheral memories connected to the input of said tact-blocking means, said peripheral memories providing a start signal, the output of said tact-blocking means being connected to the input of said backward tacting gate and to the input of said forward tacting gate, the output of said tact-blocking means being connected to the input of the step-blocking circuit.

8. A universal adaptive audiovisual teaching device as claimed in claim 7, wherein said selector means comprises a plurality of bistable register means adapted to be directly controlled by the user, free shifting register means and fast shifting register means having inputs and outputs, a first of said register means having an output connected to the operation-state gate means, a second of said register means having an output connected to the operational-state gate means, said operational-state gate means having an output connected to an input of said fast shifting register means, an output of said free shifting register means connected to an input of said fast shifting register means, said output of said operation-state gate means being connected to said operational-state gate means, and wherein said peripheral memory means includes a peripheral control gate having an input, said output of said operational-state gate means being connected to the peripheral control gate of said peripheral memory means, said fast shifting register means providing a fast shifting signal and supplying said fast shifting signal to the second OR gate of said stepping means.

9. A universal adaptive audiovisual teaching device as claimed in claim 8, wherein said peripheral memory means comprises said peripheral memories, peripheral memory control means having peripheral memory control register means, additional peripheral control means each having input and outputs, second shaping means and peripheral memory reaction gate means, said peripheral memories providing a stop signal and said peripheral memory control register means having a reset input, the output of the peripheral control gate of said peripheral memory means being connected to an input of said peripheral memory control register means, an output of said peripheral memory control means being connected to an input of said peripheral memory control register means, said selector means control register means and supplying an operational-state signal thereto, said step-blocking circuit being connected to an input of said peripheral memory control register means and supplying a stepping signal thereto, said peripheral memories being connected to an input of said tact-blocking circuit and to said peripheral control means and supplying said start signal to said tact-blocking circuit and to said peripheral control means when said peripheral memory control register means produces a logical one output signal, said peripheral memories being connected to the reset input of said peripheral memory control register means and supplying said stop signal thereto, an output of said peripheral memory control register means being connected to said peripheral memory reaction gate means via said second shaping means and an output of said peripheral memory control means being connected to said peripheral memory reaction gate means and supplying the output signal of said peripheral memory control register means to said peripheral memory reaction gate means when said peripheral memory control register means produces a logical zero output signal, an output of said peripheral memory reaction gate means being connected to an input of said forward motion permitting circuit means.